June 1, 1937.  R. J. BURROWS ET AL  2,082,536
RAIL CAR
Filed Feb. 15, 1933   3 Sheets-Sheet 1

Inventors:
Robert J. Burrows
Alfred O. Williams
By Brown, Jackson, Boettcher & Dienner
Attys.

Inventors.
Robert J. Burrows
Alfred O. Williams
By Brown, Jackson, Boettcher & Dienner June 1, 1937.  R. J. BURROWS ET AL  2,082,536
RAIL CAR
Filed Feb. 15, 1933  3 Sheets-Sheet 3
Fig. 4.
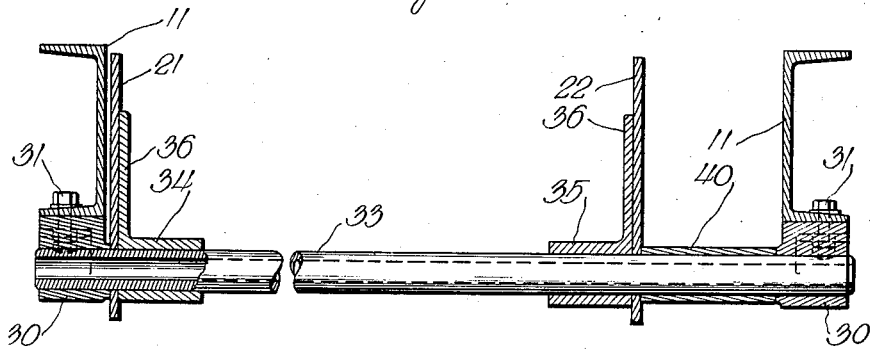
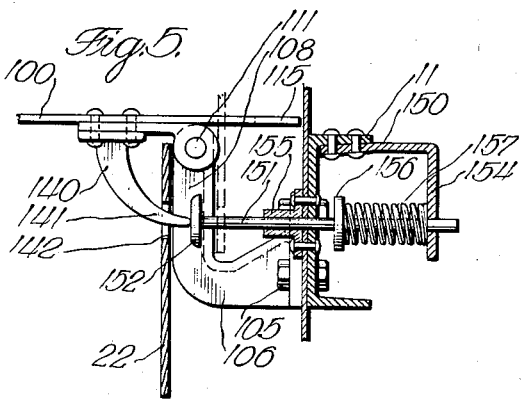
Fig. 6.
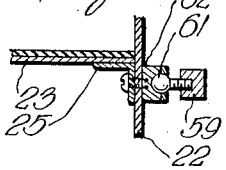
Fig. 8.
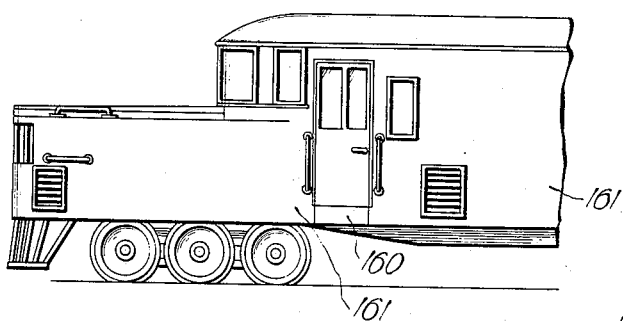
Inventors:
Robert J. Burrows
Alfred O. Williams
By Brown, Jackson, Boettcher & Dienner
Att'ys.

Patented June 1, 1937

2,082,536

UNITED STATES PATENT OFFICE 2,082,536

RAIL CAR

Robert J. Burrows and Alfred O. Williams, Battle Creek, Mich., assignors, by mesne assignments, to Clark Equipment Company, Buchanan, Mich., a corporation of Michigan Application February 15, 1933, Serial No. 656,907

20 Claims. (Cl. 105—447)

The present invention relates generally to cars and vehicles and is particularly concerned with the provision of a new and improved car or vehicle step construction.

Briefly, the principal object of the present invention is the provision of a car step for high speed stream lined rail cars and the like wherein the car step can be retracted into the body of the car so as to reduce the air resistance of the car but which is so constructed and arranged that a simple manipulation disposes the car step in a position providing for easy and convenient access to the car.

Another object of the present invention is the provision of the pivoted car step construction and means for swinging the same vertically toward and from its retracted position in which at least a portion thereof lies flush with the walls or other portions of the car.

Still further, another object of the preesnt invention is the provision of shiftable car step means which is provided with improved latching or locking mechanism by which the car steps are held in their upper or retracted position at all times that the car is in operation.

Further, another object of the present invention is the provision of a car step construction which is so correlated with the platform trap door of the car that when the steps are down the trap door cannot be lowered. In this connection, the present invention also contemplates a construction wherein the car steps cannot be lowered until the trap door is raised.

Other objects and advantages of the present invention will be apparent to those skilled in the art after a consideration of the following detailed description of one illustrative construction in which the principles of the present invention have been preferably embodied. The preferred construction has been illustrated in the accompanying drawings, in which:

Figure 4 is a sectional view taken along the line 4—4 of Figure 2 and illustrating the pivotal support for the upper end of the car step;

Figure 5 is a detail sectional view illustrating the operation of the locking means by which the car step is held in raised position when the trap door is in its lower position;

Figure 6 is a fragmentary section taken along the line 6—6 of Figure 2;

Figure 8 is a fragmentary side elevation of a rail car embodying the principles of the present invention and illustrating the car step in its upper or retracted position.

Figure 1:
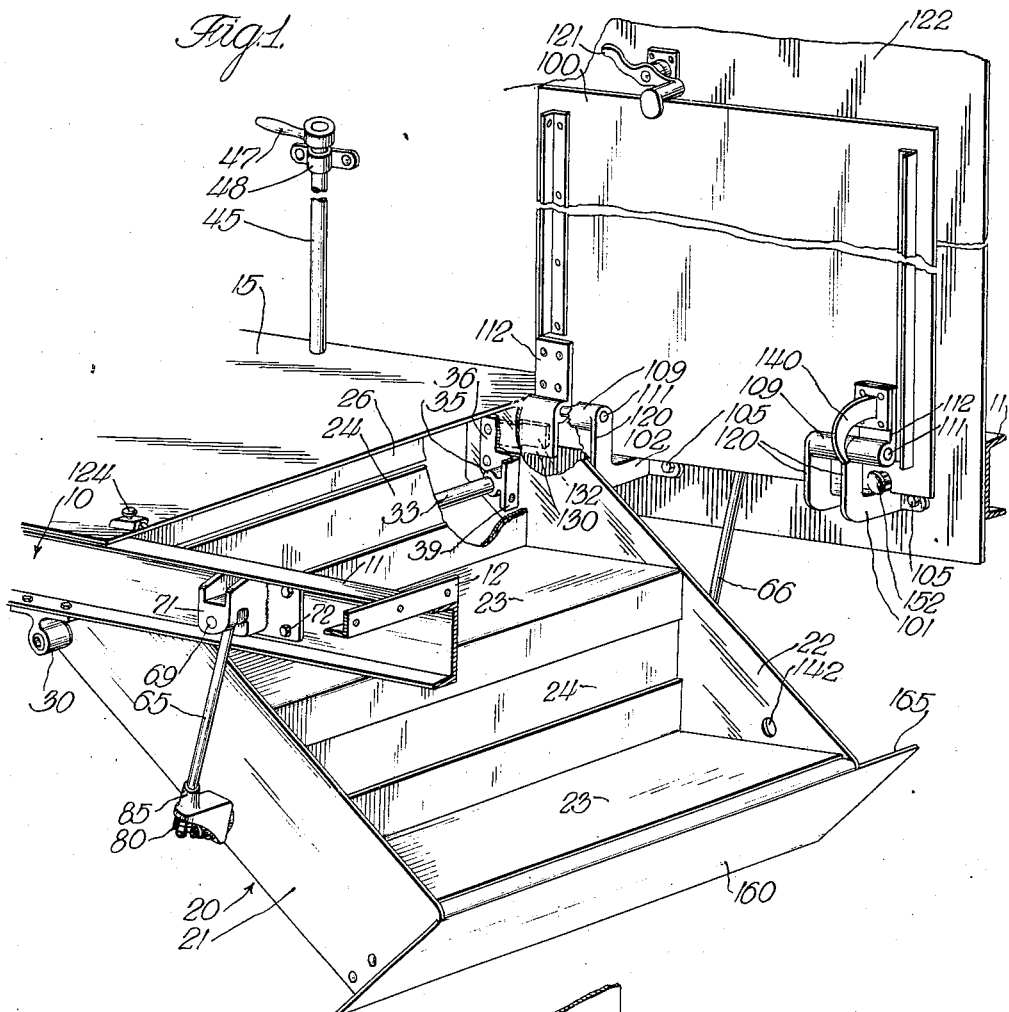
Figure 1 is a perspective, illustrating the car step in its lower position and showing the interrelation between the car step means and the other associated operating parts of the car.

Referring now to the drawings and particularly to Figure 1, the reference numeral 10 indicates the frame of the car body which comprises transverse frame members 11 and longitudinal frame members 12. The car body proper is supported upon the frame 10 and includes an entrance platform 15 supported upon the spaced transverse members 11. Entrance to the car is gained by means of a novel car step construction leading to the platform 15. It is with the car step means that the present invention is particularly concerned.

Figure 2:
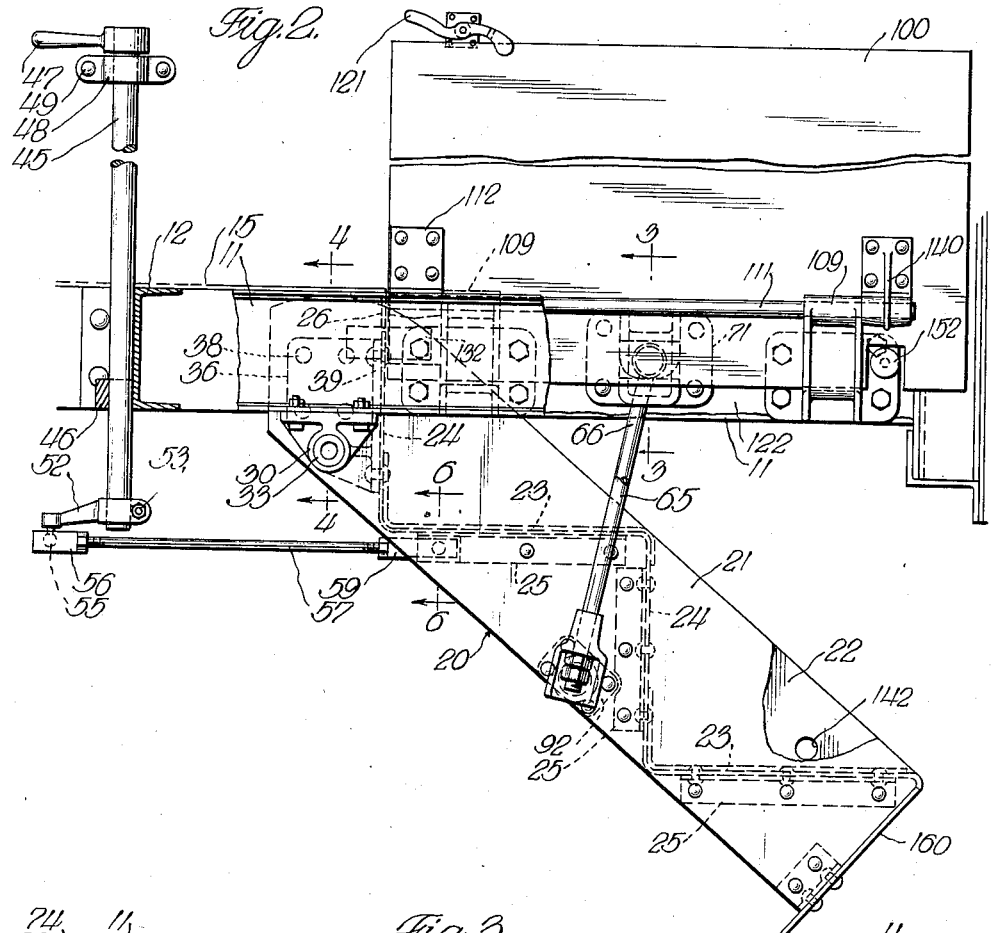
Figure 2 is a transverse vertical section taken through the car and showing the car step and the trap door in the same position in which they are illustrated in Figure 1.

In Figure 1 the car step means is indicated in its entirety by the reference numeral 20, and it will be seen that there is provided a pair of side rails 21 and 22 to which are secured the treads 23 and risers 24 which, in conjunction with the side rails 21 and 22, form the steps leading to the platform 15 of the car. Preferably, the side rails 21 and 22 and the treads and risers are formed of sheet material of suitable shape and thickness. If desired, the treads and risers may be formed of a single piece bent to the proper shape and secured to the side rails of the car step by angles 25 or the equivalent riveted or otherwise secured to the side rails, as shown in Figure 2. The risers and treads, and particularly the latter, may be provided with rubber strips to prevent slipping. As best shown in Figures 1 and 2, one edge of the platform 15 is supported by an angle 26, the vertical flange of which completes the upper riser 24 when the steps are down.

The car step 20 is pivotally connected with the car frame 10 so as to be swingable vertically and can be retracted into the body of the car and preferably into a position in between the spaced transverse frame members 11 so as to be out of the way and substantially out of the air stream, whereby the provision of car steps does not increase the air resistance of the car. Preferably, both side rails are rounded at their upper or inner ends to provide for the aforesaid pivotal movement. In order to movably support the car step 20, the lower flanges of the transverse members 11 are provided with journal brackets 30 secured thereto by bolts 31 or the equivalent. The brackets 30 have sleeve portions adapted to receive a tubular pivot shaft 33 upon which the upper or inner end of the car step is carried. For this purpose the side rails 21 and 22 carry collars or bearing members 34 and 35 each having a flange 36 bolted, riveted or otherwise secured to the side rails and in a position so that the collars receive the shaft 33. Preferably, the flanges 36 are riveted to the side rails as indicated in Figure 2 by the reference numeral 38. Also, each of the bearing members 34 and 35 are also provided with an angle flange 39 to which the upper riser 24 is riveted or otherwise secured, as best shown in Figure 1. The pivot shaft 33 may be fixedly secured in either the brackets 30 or the collar members 34 and 35, as desired.

From Figure 4 it will be observed that the car step 20 is disposed closely adjacent one of the transverse frame members 11, preferably the forward member, and is spaced a distance from the other transverse member. The car step is held in this position by means of a spacing sleeve 40 carried by the tubular pivot shaft 33 and engaging the rear collar member 30 and the outer face of the side rail 22. Certain operating mechanism is disposed in the space between the side rail 22 and the rear transverse frame member 11, as will be described later.

The car step 20 is shifted vertically by suitable operating mechanism carried by the car and connected with the car step. A vertically disposed shaft 45 is journaled for rocking movement on the car frame by suitable bracket means 46 carried by certain of the frame members, preferably one of the longitudinally disposed frame members 12, as indicated in Figure 2. The upper end of the operating shaft 45 is provided with an operating handle 47 and is journaled in a suitable bracket 48 secured to the car body by bolts or rivets 49.

Figure 7:
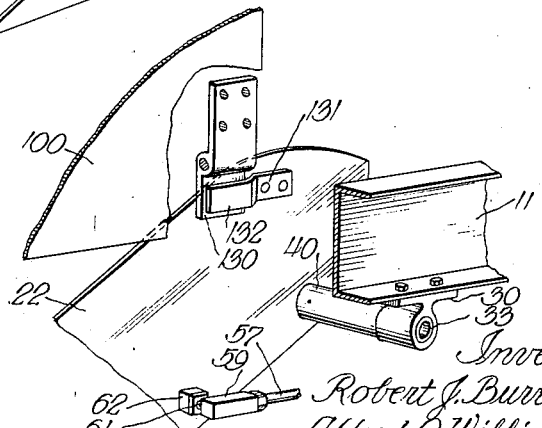
Figure 7 is a fragmentary perspective, illustrating the operation of the locking means by which the trap door is held in raised position so long as the car step is in its lower position.

The lower end of the operating shaft 45 extends slightly below the transverse frame members 11 and is provided with an arm 52 secured thereto by a clamping bolt 53. The outer end of the arm 52 carries a ball 55 to which is secured a socket member 56 adjustably connected to an operating link 57. The other end of this link is provided with a head 59 which carries a ball 61 similar in construction to the ball 55 carried by the arm 52. The ball 61 is suitably received within a socket member 62 carried by one of the side rails, preferably the side rail 22, as best shown in Figures 6 and 7. If desired, however, the ball may be carried by the member secured to the side rail and the end of the link 57 may be provided with a socket member similar to the socket member 56 which is connected with the arm 52.

By swinging the handle 47 around to the right as viewed in Figure 2, a thrust is exerted through the link 57 on the car step 20 to swing the same upwardly. Due to the pivoting of the car steps in a different plane from the swinging of the arm 52, some form of ball and socket or pivotal connection between the arm and the car step is desirable, but it is to be understood that other forms of connections between the manually controlled means carried by the car and the car step means may be provided. In the illustrated construction, it is to be understood that the relation between the arm 52 and the link 57 is such that when the car steps are in their upper position the arm 52 serves as a part of a toggle connection which can be arranged to lock the car step in its raised position between the frame members 11 and substantially in the plane of the platform 15. After the car step has been raised, swinging the handle 47 in the other direction will allow the car step to lower, as will be obvious.

The lower or down position of the car step is determined by link mechanism which not only supports the car step in its lowered position but also guides the same in its movements and which can be adjusted to bring the car step to exactly the position desired. The link mechanism comprises a pair of links 65 and 66, each having an eye 68 at its upper end which receives and accommodates a pivot pin 69 received by bracket means 71 suitably secured by bolts or rivets 72 to the web of the transverse frame members 11 and including apertured ears 73 and 74 which receive the pin 69. Preferably, the latter is secured against rotation within the bracket 71 by a small pin or key 76.

The links 65 and 66 are suspended in depending relation from the brackets 71. The lower ends of the links 65 and 66 are threaded, as at 78, and each of the links receives a pair of lock nuts 80 threaded onto the lower end of the link to serve as stop means limiting the downward swinging movement of the car step 20.

Slidably mounted on the links 65 and 66 and supporting the car step 20 is a sliding bracket construction comprising a pair of sleeve members 85 and 86 having interconnected bearing sections 87 and 88 received within journals 90 and 91 having flanges 92 connected with the side rails 21 and 22, as by bolts, rivets or the like.

Figure 3:
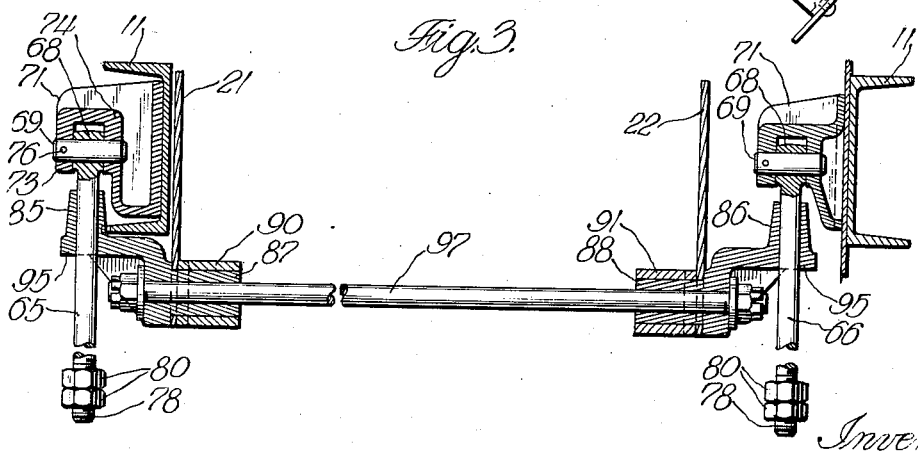
Figure 3 is a sectional view taken along the line 3—3 of Figure 2 but illustrating the car step in its upper or retracted position.

In its upper position the car step is retracted into a position between the transverse frame members 11, as best shown in Figure 3, and in this position the sleeve members 85 and 86 are disposed closely adjacent the frame members 11 and the brackets 71. In the lower position of the steps, the end portions 95 of the sleeve members 85 and 86 rest against the lock nuts 80 to limit the downward movement of the car steps. The two sleeve members 85 and 86 have their bearing sections connected together by a connecting rod 97 to hold these members in the proper lateral position. When the car step is swung vertically the sleeve sections 85 and 86 slide on the links 65 and 66.

As is usual in rail car construction, a trap door 100 is provided and is swingable about a transverse axis to and from a horizontal position in the plane of the platform and over the car steps. The present invention contemplates such a trap door 100 pivotally supported on the car frame. To this end, one of the transverse frame members 11 is provided with flanged brackets 101 and 102, see Figures 1 and 5, bolted to the flange of the member 11 by bolts 105. Each of the brackets includes a horizontally directed section 106, see Figure 5, and a vertically directed section 108 terminating in a boss 109 which receives a hinge pin 111. Hinges 112 are carried by the trap door 100 and engage the hinge pin or pintle 111. The form of the brackets 101 and 102 accommodate the rear end 115 of the trap door when the latter is in its raised position, as indicated in full lines in Figure 1 and in dotted lines in Figure 5. Each of the brackets 101 and 102 is provided with ribs or flanges 120.

The trap door is retained in its raised or upper position by means of a hand operated latch 121 of conventional construction. Preferably the latch 121 is carried by an end wall 122 forming a part of the car body and preferably being the end wall to which the shaft support 28 is connected. In its lower position the trap door is held down by a latch or lock 124 carried by the platform 15 and which may take any suitable or well known form.

Suitable interlocking means is provided to prevent the trap door from falling down when the steps are lowered, and locking means are also provided for holding the steps in raised position so long as the trap door is in lowered position. Preferably, both of these locking means include cooperating parts carried by the car step and the trap door.

The means which prevents the trap door from falling down when the car step is lowered includes an arm 130 carried by the trap door in spaced relation and preferably on or adjacent one of the hinges. This arm or plate is so disposed that when the trap door 100 is raised the arm 130 is brought to a position adjacent one of the side rails of the car step, preferably the side rail 22 as best shown in Figures 1 and 7. The side rail 22 carries an angle member in the form of a clip 131 riveted or otherwise secured to the upper end of the side rail 22. The clip 131 is mounted on the side rail 22 in such a position that the tongue portion 132 of the clip engages behind the arm 130 to hold the trap door 100 in its upper or raised position when the step is swung about its pivotal axis 33. Thus, as long as the car steps are lowered the trap door 100 is effectively retained in the position shown in Figure 1.

In order to interlock the parts as they are shown in Figure 1, it is, of course, necessary to first raise the trap door 100 to dispose the arm 130 in substantially a perpendicular position adjacent the plane of the side rail 22, then when the steps are lowered the pivotal or swinging movement of the steps about their axis 33 shifts the clip 131 into a position so that the tongue portion 132 thereof embraces the arm 130, as best shown in Figure 7. As long as the parts are in this position the trap door 100 cannot be lowered.

The interlocking means by which the steps are prevented from being lowered as long as the trap door 100 is down comprises a hook or arm 140 carried by the trap door, preferably by being secured thereto by the same rivets or bolts by which the hinge 112 is connected to the trap door, and the arm 140 includes a finger section 141 which is adapted to be projected through an opening 142 formed in the side rail 22 adjacent the lower or outer portion thereof. Figure 5 shows the side rail 22 engaged by the hook 120 so that as long as the trap door 100 is in its lowered position the steps cannot be lowered.

Associated with the hook or arm 120 is a biased mechanism for imparting to the trap door 100 an initial upward movement when it is released by the locking means 124. This biased mechanism comprises an angle bracket 150 carried by the upper flange of the rear transverse member 11 and a spring pressed plunger adapted to be engaged and shifted by the arm 140 when the trap door is lowered. The plunger includes a stem 151 and a head 152, the stem being slidably received within an opening formed in the vertical portion 154 of the bracket 150 and in a collar member 155 secured to the web of the transverse frame member 11. The plunger 151 is provided with a stop 156, which may be made adjustable if desired, and biased between the stop 156 and the bracket portion 154 is a spring 157 or the equivalent which biases the plunger for movement toward the left as viewed in Figure 5. The lower edge of the trap door 100 is notched as viewed in Figure 1 to accommodate this disposition of the plunger 151.

Mention was made above of the fact that the side rail 22 is spaced a given distance from the rear transverse frame member 11 while the forward side rail member 21 is disposed closely adjacent the forward transverse member 11. The spacing of the side rail member 22 from the rear transverse frame member 11 is for the purpose of accommodating the interlocking means described above.

When the car steps are raised and the trap door 100 is swung from its upper position to its lowered position, the hook or arm 140 is projected through the opening 142 formed in the side rail 22 of the car step and the end of the arm 141 engages the plunger head 152 and compresses the spring 157. As soon, therefore, as the latch 124 is released the spring 157 imparts an initial raising movement to the trap door 100 so that the same can be conveniently grasped and raised to and latched into the position shown in Figure 1.

As will be clear from Figure 8, the car step construction described above is preferably embodied in a stream lined rail car or other vehicle in which it is particularly desirable to withdraw or retract into the body of the vehicle any and all projecting parts so as to reduce the air resistance of the vehicle. For this purpose the pivoted car step described above is arranged to be swung upwardly into the general plane of the platform 15 and in between the transverse frame members 11 so that the step construction offers as little resistance as possible to movement through the air. To this end, the lower portions of the car step terminate in an end plate 160 which is adapted to lie flush with the side walls 161 of the car. To accommodate the spacing between the side rail 22 of the rear transverse member 11 the end plate 160 is extended rearwardly of the side rail 22, as indicated in Figure 1 by the reference numeral 165. When the car step has been raised the end plate 160 lies in the general plane of the side wall construction 161 so that not only do the steps offer little or no air resistance but the car steps are entirely out of sight.

While we have described above the construction in which the principles of our invention are preferably embodied, it is to be understood that our invention is not to be limited to the specific details shown and described but, in fact, widely different means may be employed in the practice of the broader aspects of our invention.

What we claim, therefore, and desire to secure by Letters Patent is:

1. In a car, a frame, a car body including side walls and a platform supported upon said frame, car steps including side rails and a plurality of risers and treads rigidly interconnected with and carried by the side rails, means pivotally connecting the side rails adjacent one end with the car frame, means reacting against the car frame and each of the side rails for supporting the steps in their lower position, said steps being adapted to be swung upwardly into a substantially horizontal position, and means separate from said supporting means for retaining said steps in their upper position.

2. In a car, a frame, a car body including a platform carried thereby, a trap door pivotally supported by the frame and movable into upper and lower positions, car steps including a pair of side rails and a plurality of risers and treads, means pivotally supporting said car steps adjacent one end thereof on said frame for swinging movement into upper and lower positions, means for raising and lowering said steps, and cooperating means carried by the trap door and said steps separate from said raising and lowering means for holding the trap door in elevated position when the car steps are in their lower position.

3. In a car, a frame, a car body including a platform carried thereby, a trap door pivotally supported by the frame and movable into upper and lower positions, car steps including a pair of side rails and a plurality of risers and treads, means pivotally supporting said car steps adjacent one end on said frame for swinging movement into upper and lower positions, and means carried by the trap door normally out of engagement with said steps when the latter are in their lowered position, said last named means being adapted to move into engagement with said steps for holding the latter in their upper position when the trap door is lowered.

4. In a car, a frame having transverse members, a car body including a platform carried by said members, car steps including a pair of side rails and a plurality of risers and treads connected therewith, means pivotally connecting the side rails with said transverse members so that the car steps are swingable upwardly into a position between said members, links pivotally connected with said frame members and having sliding connection with said side rails for limiting the downward movement of said steps, means carried by the car body for raising and lowering said steps, and means for locking the steps in elevated position.

5. In a car, a frame including transverse members and a platform supported thereby, a trap door pivotally mounted for vertical swinging movement toward and away from the plane of the platform, car steps carried by said transverse members and including a section movable toward and away from the plane of said transverse members, means pivotally mounting said movable section for vertical swinging movement, means for raising and lowering said movable section, and means operated by the trap door separate from said raising and lowering means and arranged when the trap door is lowered to lock the movable step section in its upper position.

6. In a car, a frame, car steps including treads, risers and side rails, means pivotally connecting the side rails adjacent the inner end thereof with the frame for vertical swinging movement, a trap door pivotally connected with the frame over the steps, and a latch carried by the trap door adjacent the outer side of the car and adapted to engage the outer portion of one of said side rails for locking the steps in upper position when the trap door is in its lower position.

7. In a car, a frame, a movable car step unit, means pivotally connecting said unit with the frame for vertical swinging movement, a trap door pivotally connected with the frame over the steps, means for raising and lowering said car step unit, and means separate from said raising and lowering means for holding the trap door in elevated position until the car step unit is raised an appreciable amount.

8. In a car, a supporting frame including transverse frame members, a platform carried thereby, brackets mounted on one of said transverse members, a trap door pivotally mounted on said brackets for vertical swinging into and out of the plane of said platform, car steps including side rails and interconnected risers and treads, brackets carried by said transverse members, a shaft carried by said last named brackets, tubular members connected, respectively, with said side rails and mounted on said shaft, whereby said steps are pivotally carried by said frame for vertical swinging under said trap door, swingably mounted links carried by said transverse members, brackets carried by said side rails and having sliding connection with said swingably mounted links to limit the downward movement of said car steps, and interengaging means carried by said trap door and one of said side rails for preventing the trap door from being lowered when the steps are in their lowered position and for preventing the steps from being lowered when the trap door is in its lowered position.

9. In a car, a frame including a transverse frame member, a platform mounted thereon, brackets carried by said transverse frame member, a trap door pivotally mounted on said brackets and swingable vertically into and out of the plane of the platform, a car step including side rails and tread means, means including parts carried by said transverse frame members for pivotally connecting said step with said frame, means carried by said trap door and shiftable, when the latter is in its upper position, into a position adjacent one of said side rails, and means carried by said one side rail and engaging said last named means when the step is lowered and the trap door raised to prevent the trap door from being lowered when the steps are in lowered position.

10. In a car, a supporting frame, a trap door pivotally mounted thereon and swingable vertically to and from the floor of the car, a car step including side rails and tread means pivotally connected with said frame, an opening formed in one of said side rails, and means carried by the trap door and adapted to be projected into said opening when the trap door is lowered for holding the car step in elevated position and to prevent the same from being lowered while the trap door is down.

11. In a car, a supporting frame, a trap door pivotally mounted thereon and swingable vertically to and from the floor of the car, a car step including side rails and tread means pivotally connected with said frame, means carried by the trap door and swingable therewith into a plane adjacent the plane of one of the side rails when the trap door is raised, and a bracket carried by said one side rail and adapted to embrace said last named means when the trap door is raised and when the step is lowered, to prevent the trap door from being lowered when the step is down.

12. In a car, a supporting frame, a trap door pivotally mounted thereon and swingable vertically to and from the floor of the car, a car step including side rails and tread means pivotally connected with said frame, an opening formed in one of said side rails, a bracket carried by said trap door and having a portion curved generally about the pivotal axis of the trap door and adapted to be projected into said opening when the trap door is lowered and the car step is in its upper position, whereby the car step is held in raised position as long as the trap door is lowered, and spring means carried by said frame and cooperating with said bracket for biasing the trap door for movement upwardly.

13. In a car, a supporting frame, a trap door pivotally connected with said frame, car steps including side rails and tread means carried thereby, means pivotally connecting the side rails with the car frame for vertical swinging movement into and out of the general plane of the frame, a vertically disposed shaft journaled for rotation on the frame, an arm carried at the lower end of said shaft, link means connected with said arm and with one of said side rails, means for rocking the shaft to raise and lower the car steps, said trap door being swingable independently of said steps, and interengaging means carried by said trap door and said steps for preventing the trap door from being lowered when the steps are in their lowered position and for preventing the steps from being lowered when the trap door is in its lowered position.

14. In a car, a supporting frame including transverse members, a car body supported thereon and including a platform carried by said transverse members, a car step comprising side rails and a plurality of treads and risers, pivot brackets supported on the underside of said transverse members, a shaft supported in said pivot brackets, sleeve means supporting said car step on said shaft with one of the side rails disposed adjacent one of the transverse members and the other of said side rails being spaced from the other of said transverse members, brackets carried by said other transverse frame member, a trap door pivotally mounted on said last named brackets and swingable vertically to and from a position above said car step and substantially in the plane of said platform, said car steps being swingable vertically about said shaft as an axis substantially into the plane of said platform and between said transverse members, link means limiting the downward swinging movement of said steps, operating means carried by the car for swinging said car steps vertically, means carried by said car step and cooperating with the trap door to prevent the latter from being lowered when the car step is down, and means carried by the trap door and cooperating with the step to prevent the car step from being lowered when the trap door is down.

15. In a stream lined vehicle, a supporting frame including transverse members, a vehicle body supported on said frame and having side walls, a movably mounted step construction pivotally supported from said transverse frame members and adapted to be disposed in one position to provide for entrance into the vehicle body, and a trap door pivotally connected with one of said transverse frame members and adapted when open to be disposed between said step construction and said one member, said step construction being adapted to be disposed in another position with portions thereof substantially flush with the walls of the vehicle body and also serving to close the space between the step construction and said one transverse frame member to accommodate and complete the stream lined shape of the body.

16. In a car, a frame, a car body including a platform carried thereby, a trap door pivotally supported by the frame and movable into upper and lower positions, car steps including a pair of side rails and a plurality of risers and treads, means pivotally supporting said car steps adjacent one end thereof on said frame for swinging movement into upper and lower positions, and catch means movable into door engaging position by the movement of said steps to their lower position for holding the trap door in its upper position.

17. In a car, a frame, a car body including a platform carried thereby, a trap door pivotally supported by the frame and movable into upper and lower positions, car steps including a pair of side rails and a plurality of risers and treads, means pivotally supporting said car steps on said frame for swinging movement into upper and lower positions, and catch means movable into step engaging position by the movement of said trap door to its lower position for holding said steps in their upper position.

18. In a car, a car body having a step well, a step unit pivotally mounted in said well, there being a space between said step unit and one side of said well, a trap door adapted to close said well, and pivot means disposed in said space and serving to pivotally support said trap door for movement about an axis disposed normal to and outwardly and to one side of said step axis.

19. In a car, a car body having a step well and side walls, a step unit pivotally mounted in said well, there being a space between said step unit and one side of said well, a trap door adapted to close said well, pivot means disposed in said space and serving to pivotally support said trap door, and means carried by said step unit substantially flush with said side walls and serving as a closure for said space when the step unit is raised.

20. In a car, a car body having a floor with a step well formed therein, a car step unit mounted in said well, there being a space between said step unit and one side of said well, a trap door adapted to close said well, pivot means for said step unit disposed below the level of said floor, and pivot means for said trap door disposed below the level of said floor and in the space between said step unit and said one side of the step well.

ROBERT J. BURROWS.
ALFRED O. WILLIAMS.